(12) United States Patent
Fan

(10) Patent No.: US 12,547,527 B2
(45) Date of Patent: Feb. 10, 2026

(54) INTELLIGENT CUSTOMER SERVICE REQUEST PROCESSING MECHANISM

(71) Applicant: Dell Products L.P., Round Rock, TX (US)

(72) Inventor: Huijuan Fan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 259 days.

(21) Appl. No.: 18/223,641

(22) Filed: Jul. 19, 2023

(65) Prior Publication Data

US 2024/0354229 A1    Oct. 24, 2024

(30) Foreign Application Priority Data

Apr. 20, 2023    (CN) .................. 202310430168.5

(51) Int. Cl.
  *G06F 9/44* (2018.01)
  *G06F 11/3668* (2025.01)
  *G06Q 30/015* (2023.01)
(52) U.S. Cl.
  CPC ....... *G06F 11/3668* (2013.01); *G06Q 30/015* (2023.01)
(58) Field of Classification Search
  None
  See application file for complete search history.

(56) References Cited

U.S. PATENT DOCUMENTS

| | | | |
|---|---|---|---|
| 10,904,383 B1* | 1/2021 | Thornhill | H04M 3/5233 |
| 2014/0114713 A1* | 4/2014 | Ben Simhon | G06Q 10/063112 |
| | | | 705/7.14 |
| 2017/0132724 A1* | 5/2017 | Aqlan | G06Q 10/063112 |
| 2019/0347282 A1* | 11/2019 | Cai | G06N 5/022 |
| 2020/0293946 A1* | 9/2020 | Sachan | G06N 5/04 |
| 2022/0180290 A1* | 6/2022 | Xin | G06F 40/40 |
| 2022/0215325 A1* | 7/2022 | Odibat | G06Q 10/063114 |
| 2023/0245011 A1* | 8/2023 | Tiwari | G06Q 10/063112 |
| | | | 705/7.14 |

OTHER PUBLICATIONS

Productplan.com, "Weighted Scoring",https://web.archive.org/web/20191224010544/https://www.productplan.com/glossary/weighted-scoring/, Dec. 2019 (Year: 2019).*

* cited by examiner

*Primary Examiner* — Bradley A Teets
*Assistant Examiner* — Lanny N Ung
(74) *Attorney, Agent, or Firm* — Krishnendu Gupta; Lesley Leonessa

(57) ABSTRACT

Methods, system, and non-transitory processor-readable storage medium for an issue resolution system are provided herein. An example method includes receiving, by an issue resolution system, from a tester system, a defect issue that occurred on the tester system while the tester system was executing. The issue resolution system identifies at least one resource, where one or more resources are associated with a skill score associated with at least one target domain in a required domain set, where the skill score meets a threshold. The issue resolution system identifies a targeted resource having a maximum overall defect issue resolution score, where one or more resource comprises the targeted resource. The issue resolution system updates the required domain set by removing at least one domain where the required domain set comprises the at least one domain.

18 Claims, 5 Drawing Sheets

INTELLIGENT CUSTOMER SERVICE REQUEST PROCESSING MECHANISM

FIELD

The field relates generally to optimizing defect issues resolution, and more particularly to optimizing defect issues resolution in information processing systems.

BACKGROUND

Providing a quick response and accurate resolution when defect issues occur in an information processing system is a competitive strategy that will set a company apart from the competition. Resolving defect issues for customers quickly, and effectively assigning and utilizing the available skilled resources for those resolutions, therefore, is critical to the success of a company.

SUMMARY

Illustrative embodiments provide techniques for implementing an issue resolution system in a storage system. For example, illustrative embodiments receive, by an issue resolution system, from a tester system, a defect issue that occurred on the tester system while the tester system was executing. The issue resolution system identifies at least one resource, where the resource is associated with a skill score associated with at least one target domain in a required domain set, where the skill score meets a threshold. The issue resolution system identifies a targeted resource having a maximum overall defect issue resolution score, where at least one resource comprises the targeted resource, and updates the required domain set by removing at least one domain where the required domain set comprises at least one domain. Other types of processing devices can be used in other embodiments. These and other illustrative embodiments include, without limitation, apparatus, systems, methods and processor-readable storage media.

DETAILED DESCRIPTION

Figure 1:
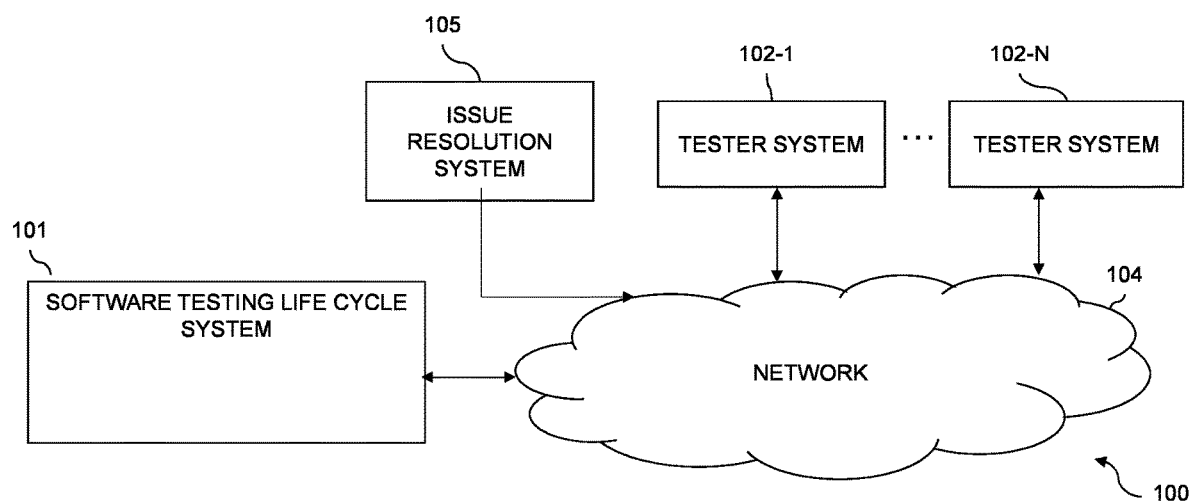
FIG. 1 shows an information processing system including an issue resolution system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing an issue resolution system, which technique may be used to provide, among other things, issue resolution optimization to select the optimal resource for defects that occur during testing by receiving, by an issue resolution system, from a tester system, a defect issue that occurred on the tester system while the tester system was executing. The issue resolution system identifies at least one resource, where the resource is associated with a skill score associated with at least one target domain in a required domain set, where the skill score meets a threshold. The issue resolution system identifies a targeted resource having a maximum overall defect issue resolution score, where at least one resource comprises the targeted resource, and updates the required domain set by removing at least one domain where the required domain set comprises at least one domain.

When complex defect issues occur during testing and/or execution of information systems, engineers who are experts in different domain areas may be needed. Conventional technologies for resolving defect issues involve manual processes where one expert (i.e., an engineer) takes a look at the defect issue, and determines whether the defect issue needs to be assigned to another engineer who is an expert in a particular domain. Conventional technologies that utilize a manual process are inefficient since defect issues may be assigned and reassigned among different domain experts through this manual process. Conventional technologies that triage defect issues typically associate defect issues with one target domain, when, in reality, complex defect issues require solutions that involve multiple domain areas. Conventional technologies assign complex defect issues to the most skilled experts in a given domain, and this causes a bottleneck issue among those experts, where the experts become too busy to efficiently identify and resolve all the defect issues assigned to them.

By contrast, in at least some implementations in accordance with the current technique as described herein, defect issue resolution is optimized by receiving, by an issue resolution system, from a tester system, a defect issue that occurred on the tester system while the tester system was executing. The issue resolution system identifies at least one resource, where the resource is associated with a skill score associated with at least one target domain in a required domain set, where the skill score meets a threshold. The issue resolution system identifies a targeted resource having a maximum overall defect issue resolution score, where at least one resource comprises the targeted resource, and updates the required domain set by removing at least one domain where the required domain set comprises at least one domain.

Thus, a goal of the current technique is to provide a method and system for providing an issue resolution system that can intelligently process customer service requests to resolve complex defect issues. Another goal is to determine the similarity between current defect issues and historical defect issues, and use that data to perform domain matching. Another goal is to match the most skilled and available experts (in multiple domains associated with the defect issue) to collaboratively and efficiently debug and resolve the defect issue.

In at least some implementations in accordance with the current technique described herein, the use of an issue resolution system can provide one or more of the following advantages: provide an automated system that efficiently identifies the target domains for complex defect issues and identifies the minimum amount of expert resources that have availability to efficiently resolve the defect issue and avoid bottlenecks among the expert resources, provide domain matching for defect issues using historical defect issues and similarity calculations, and match the most skilled and available experts (in multiple domains associated with the defect issue) to collaboratively and efficiently debug and resolve the defect issue.

In contrast to conventional technologies, in at least some implementations in accordance with the current technique as described herein, defect issue resolution is optimized by receiving, by an issue resolution system, from a tester system, a defect issue that occurred on the tester system while the tester system was executing. The issue resolution system identifies at least one resource, where the resource is associated with a skill score associated with at least one target domain in a required domain set, where the skill score meets a threshold. The issue resolution system identifies a targeted resource having a maximum overall defect issue resolution score, where at least one resource comprises the targeted resource, and updates the required domain set by removing at least one domain where the required domain set comprises at least one domain.

In an example embodiment of the current technique, the issue resolution system performs, until the required domain set is empty, the steps of identifying at least one resource, identifying the targeted resource, and removing at least one domain.

In an example embodiment of the current technique, a defect issue analysis tool performs analysis of the defect issue, and identifies a footprint associated with the defect issue.

In an example embodiment of the current technique, the issue resolution system performs target domain matching for the defect issue to identify the required domain set, where the required domain set comprises at least one target domain having a similarity with the defect issue.

In an example embodiment of the current technique, the issue resolution system measures the similarity between the defect issue and a historical defect issue using Cosine Similarity.

In an example embodiment of the current technique, the issue resolution system measures the similarity between the defect issue and a historical defect issue using footprint information associated with the defect issue.

In an example embodiment of the current technique, the issue resolution system identifies at least one historical defect issue, where the similarity associated with at least one historical defect issue exceeds a similarity threshold. The issue resolution system identifies at least one domain associated with at least one historical defect issue, and adds at least one domain to the required domain set.

In an example embodiment of the current technique, the issue resolution system identifies the defect issue is a duplicate of at least one historical defect issue.

In an example embodiment of the current technique, the issue resolution system determines there are no historical defect issues that exceed a similarity threshold. The issue resolution system identifies at least one historical defect issue, where the similarity associated with at least one historical defect issue approaches the similarity threshold. The issue resolution system ranks at least one historical defect issue, and identifies at least one high ranking historical defect issue that ranks near the top of the ranked at least one historical defect issue. The issue resolution system identifies at least one domain associated with at least one high ranking historical defect issue, and adds at least one domain to the required domain set.

In an example embodiment of the current technique, the issue resolution system accesses a defect issue resolution repository to identify at least one resource.

In an example embodiment of the current technique, the issue resolution system determines an availability score associated with at least one resource.

In an example embodiment of the current technique, the issue resolution system determines an overall defect issue resolution score for at least one resource, where the overall defect issue resolution score comprises a skill level of at least one resource on the required domain set.

In an example embodiment of the current technique, the issue resolution system determines at least one target domain in which at least one resource is skilled.

In an example embodiment of the current technique, the issue resolution system determines a weighted overall defect issue resolution score for at least one resource where the weighted overall defect issue resolution weights an overall defect issue resolution score for at least one resource and an availability score associated with at least one resource. The issue resolution system identifies at least one resource with a highest weighted overall defect issue resolution score as the targeted resource.

In an example embodiment of the current technique, the issue resolution system transfers the defect issue to the targeted resource for resolution of the defect issue.

In an example embodiment of the current technique, the issue resolution system identifies a plurality of targeted resources, and selects a subset of the plurality of targeted resources for resolution of the defect issue.

In an example embodiment of the current technique, the issue resolution system identifies at least one domain as at least one target domain in which the targeted resource is skilled.

FIG. 1 shows a computer network (also referred to herein as an information processing system) 100 configured in accordance with an illustrative embodiment. The computer network 100 comprises a software testing life cycle system 101, issue resolution system 105, and tester systems 102-N. The software testing life cycle system 101, issue resolution system 105, and tester systems 102-N are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is an issue resolution system 105 that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the tester systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The tester systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the issue resolution system 105 are one or more input-output devices, which illustratively comprise keyboards, displays or other types of input-output devices in any combination. Such input-output devices can be used, for example, to support one or more user interfaces to the issue resolution system 105, as well as to support communication between the issue resolution system 105 and other related systems and devices not explicitly shown. For example, a dashboard may be provided for a user to view a progression of the execution of the issue resolution system 105. One or more input-output devices may also be associated with any of the tester systems 102-N.

Additionally, the issue resolution system 105 in the FIG. 1 embodiment is assumed to be implemented using at least one processing device. Each such processing device generally comprises at least one processor and an associated memory, and implements one or more functional modules for controlling certain features of the issue resolution system 105.

More particularly, the issue resolution system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the issue resolution system 105 to communicate over the network 104 with the software testing life cycle system 101, and tester systems 102-N and illustratively comprises one or more conventional transceivers.

An issue resolution system 105 may be implemented at least in part in the form of software that is stored in memory and executed by a processor, and may reside in any processing device. The issue resolution system 105 may be a standalone plugin that may be included within a processing device.

It is to be understood that the particular set of elements shown in FIG. 1 for issue resolution system 105 involving the software testing life cycle system 101, and tester systems 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the issue resolution system 105 can be on and/or part of the same processing platform.

An exemplary process of issue resolution system 105 in computer network 100 will be described in more detail with reference to, for example, the flow diagram of FIG. 2.

Figure 2:
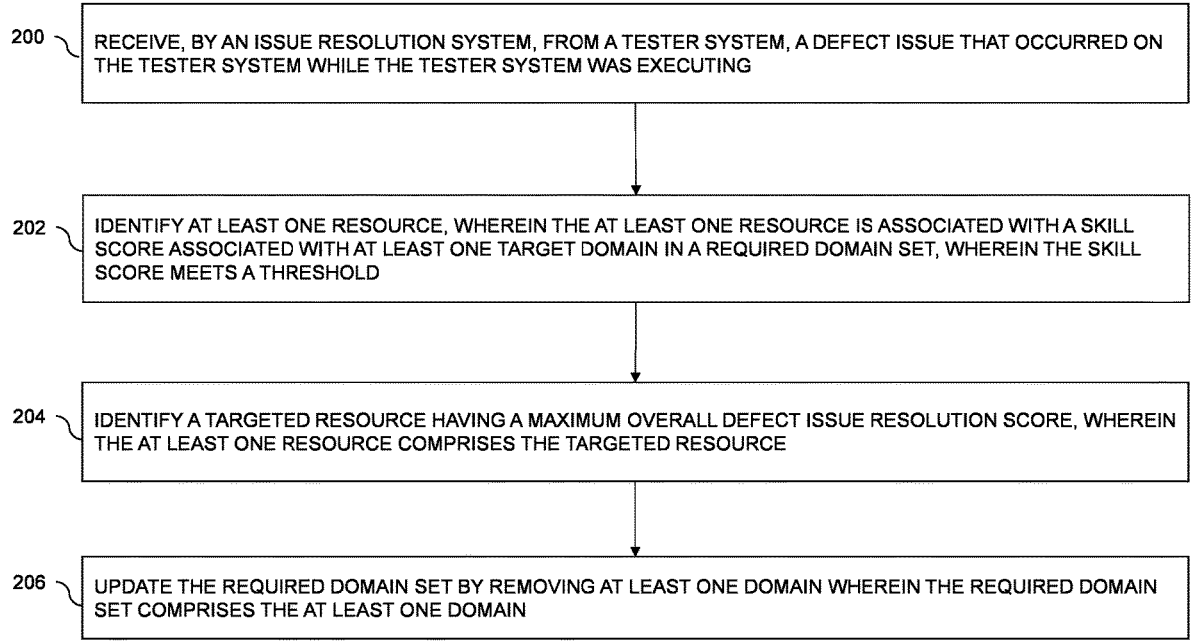
FIG. 2 shows a flow diagram of a process for an issue resolution system in an illustrative embodiment.

FIG. 2 is a flow diagram of a process for execution of the issue resolution system 105 in an illustrative embodiment. It is to be understood that this particular process is only an example, and additional or alternative processes can be carried out in other embodiments.

At 200, the issue resolution system 105 receives from a tester system 102-N, a defect issue that occurred on the tester system 102-N while the tester system 102-N was executing. In an example embodiment, a defect issue analysis tool performs an analysis of the defect issue, and identifies a footprint associated with the defect issue. For example, bug analysis tools exist that collect logs and perform an initial analysis of the defect issue, and output a footprint associated with the defect issue. In an example embodiment, a footprint is a concise description of a defect issue that consists of a variety of information. An example of a footprint is listed below:

| Field | Value |
| --- | --- |
| Defect | 648437 |
| Type | safe |
| Component | Mlu, MRedirector |
| Module | /builds/storage/KH/upc-Unity.0-201406090603/safe/catmerge/layered/MLU/krnl/Dart/server/src/d2c/cbfs/d2c_panic_utils.c |
| Line | 52 |
| Method | dart_fix_assert |
| Assert | DART: ASSERT FAILED: %s (%s:%d)\n:0 |
| Stack | ... |
| | mlu.sys!dart_fix_assert |
| | mlu.sys!UFS64_LogDevice::splitterForDummies |
| | ... |

At 202, the issue resolution system 105 identifies at least one resource where one or more resources are associated with a skill score associated with at least one target domain in a required domain set, and where the skill score meets a threshold. In an example embodiment, the issue resolution system 105 accesses a defect issue resolution repository to identify at least one resource. For example, there may be a repository that tracks tasks assigned to engineers, and the domain skill level of those engineers. A repository that tracks the daily tasks of engineers can also provide information as to the skill level of those engineers. This information allows the issue resolution system 105 to match the most skilled engineers to efficiently debug issue defects. Tracking the engineers' daily tasks also provides information as to their workload to identify the most skilled engineers that may also have the bandwidth to quickly debug defect issues.

In an example embodiment, the resource is associated with a skill score associated with at least one target domain in a required domain set, where the skill score meets a threshold. In an example embodiment, the issue resolution system 105 measures the similarity between the defect issue and a historical defect issue using the footprint information associated with the defect issue. In an example embodiment, the issue resolution system 105 measures the similarity between the defect issue and a historical defect issue using Cosine Similarity. For example, based on the information in the footprint, Cosine Similarity may be used to measure the similarity between two issue defects. An example use of Cosine Similarity is listed below:

$$S_{bug\ i, bug\ j} = \frac{\sum_{k=1}^{N} V_{bug\ i, field\ k} \cdot V_{bug\ j, field\ k}}{\sqrt{\sum_{k=1}^{N} (V_{bug\ i, field\ k})^2} \cdot \sqrt{\sum_{k=1}^{N} (V_{bug\ j, field\ k})^2}}$$

In the above example, $V_{bug\ i, field\ k}$ is the digitized value of defect issue i (i.e., the "bug") against field k, where the digitized value is normalized from the value (which may be in a string format, or any other format), and N is the count of the fields defined in the footprint. In the above example, S is a range of values between 0 and 1. A value of 0 indicates that there is no association between the two issue defects (i.e., "bugs"). A value of 1 indicates the two issue defects are almost the same. In other words, the closer the value is to 1, the more similar the two issue defects are.

Figure 3:
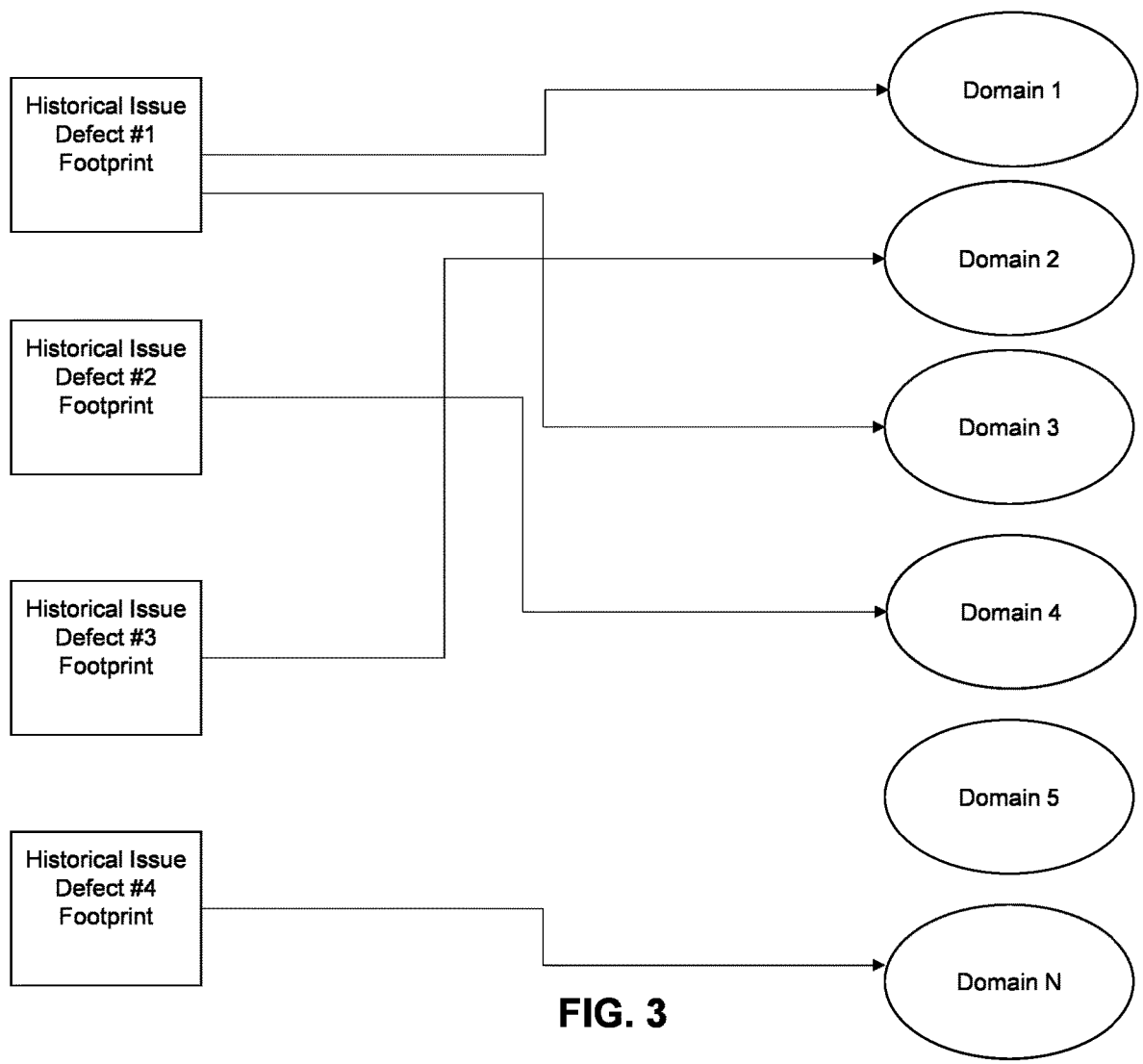
FIG. 3 shows an example historical issue defect list linked to associated domains in an illustrative embodiment.

In an example embodiment, the issue resolution system 105 performs target domain matching for the defect issue to identify the required domain set, where the required domain set comprises at least one target domain having a similarity with the defect issue. In an example embodiment, the issue resolution system 105 identifies at least one historical defect issue, where the similarity associated with the historical defect issue exceeds a similarity threshold. The issue resolution system 105 then identifies at least one domain associated with the historical defect issue, and adds the domain to the required domain set. FIG. 3 illustrates an example set of historical issue defects where at least one domain is associated with each of the historical defect issues. In other words, the issue resolution system 105 calculates the similarity between the issue defect and a plurality of historical defect issues. For those historical defect issues that have a similarity degree higher than a similarity threshold, the issue resolution system 105 selects the associated domain and adds that domain to the required domain set.

In an example embodiment, the plurality of historical defect issues comprises defect issues where the root cause of the defect was identified and the defect was debugged (i.e., "fixed"). In an example embodiment, the similarity threshold may be determined by real practices, and the threshold may vary based on different situations and accuracy requirements. In an example embodiment, the issue resolution system 105 identifies that the defect issue is a duplicate of at least one historical defect issue. For example, if during the target domain matching, one or more historical defect issues are identified that have a similarity threshold higher than 98%, the domains (associated with those historical defect issues) are added to the required domain set. In this example scenario, the defect issue is a common and duplicated defect issue.

For example, if during the target domain matching, one or more historical defect issues are identified that have a similarity threshold higher than 88%, but lower than 98%, those historical defect issues are ranked by similarity and, for example, the top three domains (associated with those historical defect issues) are added to the required domain set. In this example scenario, the defect issue is similar to a historical defect issue, and the historical analysis of that historical defect issue may be of value for debugging the defect issue.

In an example embodiment, the issue resolution system 105 determines that there are no historical defect issues that exceed a similarity threshold. In this example scenario, the issue resolution system 105 identifies one or more historical defect issues, where the similarity associated with those historical defect issues approaches the similarity threshold, and ranks those historical defect issues. The issue resolution system 105 then identifies one or more high ranking historical defect issues that rank near the top of the ranked list of historical defect issues, and identifies at least one domain associated with those high ranking historical defect issues. The issue resolution system 105 then adds the domain(s) to the required domain set. For example, if during the target domain matching, no historical defect issues are identified that have a similarity threshold higher than 85%, then the defect issue is rare, or the plurality of historical defect issues is not expansive enough to include this defect issue. In this case, successful debugging of the defect issue can enhance the plurality of historical defect issues so that a higher similarity threshold occurs the next time this particular defect issue occurs.

Thus, there is a plurality of historical defect issues where the root cause of the defect issue is determined and fixed. When a new defect issue is identified, the detailed footprint of the new defect issue is determined, and used in the similarity calculation (using the Cosine Similarity calculation). The similarity threshold is determined and used to identify multiple target domains in the required domain set.

At 204, the issue resolution system 105 identifies a targeted resource having a maximum overall defect issue resolution score, where one or more resources 9 comprises the targeted resource. In an example embodiment, once the issue resolution system 105 has performed target domain matching for the defect issue to identify the required domain set, the issue resolution system 105 calculates a skill score on the required domain set for each engineer. In an example embodiment, the issue resolution system 105 determines at least one target domain in which at least one resource (i.e., engineer) is skilled. An engineer may be skilled on one or more domains.

The skill score of engineer i on domain j may be defined as:

$$L_{Engineer\ i, Domain\ j}$$

In an example embodiment, there may be three levels of skill defined, each with a different score, for example, a novice engineer might have a score of zero, a proficient engineer might have a score of three, and an expert engineer might have a score of five.

In an example embodiment, the issue resolution system 105 determines an overall defect issue resolution score for one or more resources. The overall defect issue resolution score comprises a skill level of each resource (i.e., engineer) on the required domain set. In an example embodiment, the overall defect issue resolution score may be calculated as listed below:

$$L_{Engineer\ i, Multi\ Domains} = \sum_{Domain\ j \in multi\ domains} L_{Engineer\ i, Domain\ j}$$

In an example embodiment, the issue resolution system 105 determines an availability score associated with one or more resources. The availability score is the available time of engineer i during a time period k. For example, the available time of the engineer may be in hourly increments, and the time period may be a range of days during which the defect issue is expected to be identified and debugged. In an example embodiment, the engineer's availability may be determined from the defect issue resolution repository that was used to identify at least one resource capable of resolving the issue defect.

In an example embodiment, the issue resolution system 105 determines a weighted overall defect issue resolution score for at least one resource where the weighted overall defect issue resolution weights an overall defect issue resolution score for at least one resource and an availability score associated with at least one resource, and identifies at least one resource with a highest weighted overall defect issue resolution score as the targeted resource. In an example embodiment, the weighted criterion P (i.e., the weighted overall defect issue resolution score) is calculated as follows:

$$P = \omega_L \cdot L + \omega_T \cdot T$$

In an example embodiment, the weighted criterion P combines an engineer's skill level along with the available effort that can be utilized during a given time period. The variable L represents the engineer's skill level, and the variable T represents the available effort. The variables $\omega_L$ and $\omega_T$ represent the weight of the engineer's skill level and the weight of the available effort. The variables $\omega_L + \omega_T = 1$, and can be tuned to achieve better domain expert assignment efficiency. In an example embodiment, the default values for $\omega_L = 0.6$ and $\omega_T = 0.4$. In an example embodiment, the weight for the available effort is less than the weight for the skill level because a skilled engineer would likely spend less time debugging and resolving the issue defect.

In an example embodiment, the weighted criterion P formula can be expanded as follows:

$$P_{Engineer\ i, Required\ domain\ set, Period\ k} = \omega_L \cdot \frac{L_{Engineer\ i, Required\ domain\ set}}{\sum_{all\ engineers} L_{Engineer\ i, Required\ domain\ set}}$$
$$+ \omega_T \cdot \frac{T_{Engineer\ i, Period\ k}}{\sum_{all\ engineers} T_{Engineer\ i, Period\ k}}$$

In an example embodiment, the issue resolution system 105 identifies a plurality of targeted resources, and selects a subset of the plurality of targeted resources for resolution of the defect issue. For example, the issue resolution system 105 may select the targeted resources with the highest weighted overall defect issue resolution score. In an example embodiment, the issue resolution system 105 selects the engineer with the highest $P_{Engineer\ i, Required\ domain\ set, Period\ k}$ as the targeted resource who should be tasked with resolving the defect issue. In an example embodiment, the engineer is selected from the subset of the plurality of targeted resources. The issue resolution system 105 then transfers the defect issue to the targeted resource for resolution of the defect issue.

At 206, the issue resolution system 105 updates the required domain set by removing at least one domain where the required domain set comprises the domain. In an example embodiment, the issue resolution system 105 identifies at least one domain as one or more target domains in which the targeted resource is skilled. In other words, the issue resolution system 105 removes the target domains from the required domain set that can be handled by target resource(s) (for example, engineers with a domain skill level, or skill score equaled to five). In an example embodiment, if the targeted resource is skilled across multiple target domains (for example, again, engineers with a skill score equaled to 5), the issue resolution system 105 will select fewer targeted resources, meaning the issue resolution system 105 will select fewer engineers skilled across multiple target domains over more engineers, each skilled over fewer target domains. The rationale behind this selection is that one engineer handling multiple domains results in less communications time, avoids miscommunications, and increases efficiency over communicating with multiple engineers, and this improves the overall processing performance of resolving the defect issue.

In an example embodiment, the issue resolution system 105 performs the steps of identifying at least one resource, identifying the targeted resource, and removing at least one domain until the required domain set is empty. In an example embodiment, after the issue resolution system 105 removes the one or more target domains in which the targeted resource is skilled, the issue resolution system 105 checks if the required domain set is empty. If it is, the issue resolution system 105 ends the process. If the required domain set is not empty, the issue resolution system 105 goes back to the step of performing the target domain matching for the defect issue to identify the required domain set, and iteratively repeats the process of identifying at least one resource, identifying the targeted resource, and removing at least one domain until the required domain set is empty.

In an example embodiment, the defect issue is retested on a tester system. The tester system may be the original tester system 102-1 that initially detected the defect issue, or it could be a different tester system 102-N. If the defect issue is not resolved, or if a new defect issue occurs, the issue resolution system 105 receives from the tester system (in this example scenario, tester system 102-1 or tester system 102-N) notification of the defect issue (i.e., whether the defect issue is the same as the original defect issue, or is a new defect issue). The issue resolution system 105 then goes back to the step of performing the target domain matching for the defect issue to identify the required domain set, and iteratively repeats the process of identifying at least one resource, identifying the targeted resource, and removing at least one domain until the required domain set is empty. If the defect issue is resolved, the issue resolution system 105 ends the process.

Accordingly, the particular processing operations and other functionality described in conjunction with the flow diagram of FIG. 2 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly and efficiently improve resolution of defect issues. These and other embodiments provide an issue resolution system that can intelligently process customer service requests to resolve complex defect issues. Embodiments disclosed herein determine the similarity between current defect issues and historical defect issues, and use that data to perform domain matching. Embodiments disclosed herein match the most skilled and available experts (in multiple domains associated with the defect issue) to collaboratively and efficiently debug and resolve the defect issue.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of the information processing system 100, these platforms may also be used to implement at least portions of other information processing systems in other embodiments.

Figure 4:
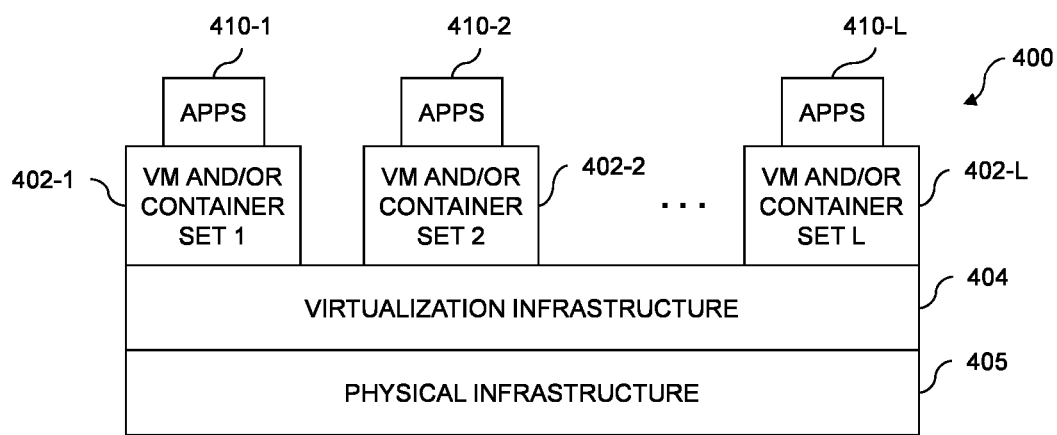
FIGS. 4 and 5 show examples of processing platforms that may be utilized to implement at least a portion of an issue resolution system embodiments.
Figure 5:
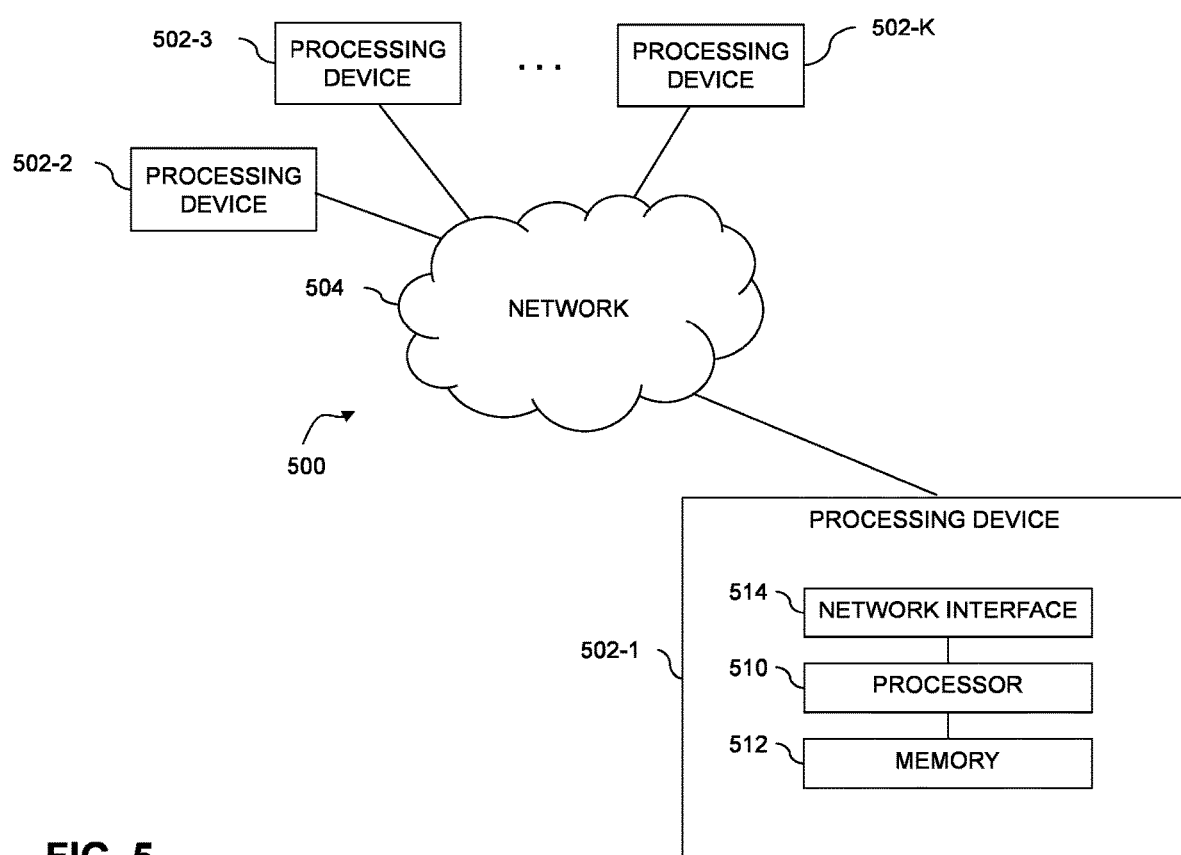

FIG. 4 shows an example processing platform comprising cloud infrastructure 400. The cloud infrastructure 400 comprises a combination of physical and virtual processing resources that are utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 comprise respective VMs, respective sets of one or more containers, or respective sets of one or more containers running in VMs. In some implementations of the FIG. 4 embodiment, the VMs/container sets 402 comprise respective VMs implemented using virtualization infrastructure 404 that comprises at least one hypervisor.

A hypervisor platform may be used to implement a hypervisor within the virtualization infrastructure 404, where the hypervisor platform has an associated virtual infrastructure management system. The underlying physical machines comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 400 in this embodiment comprises a portion of the information processing system 100 and includes a plurality of processing devices, denoted 502-1, 502-2, 502-3, . . . 502-K, which communicate with one another over a network 504.

The network 504 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 502-1 in the processing platform 500 comprises a processor 510 coupled to a memory 512.

The processor 510 comprises a microprocessor, a microcontroller, an application-specific integrated circuit (ASIC), a field-programmable gate array (FPGA) or other type of processing circuitry, as well as portions or combinations of such circuitry elements.

The memory 512 comprises random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 404 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

receiving, by an issue resolution system, from a tester system, a software code defect issue that occurred on the tester system while the tester system was executing automated software testing operations on software under test;

performing, by a software code defect issue analysis tool, analysis of the software code defect issue to identify a footprint associated with the software code defect issue, wherein the footprint comprises defect analysis characteristics comprising component information, module information, code line information, software method information, test assert information, and software execution stack trace information specifically generated during software testing execution and indicative of software testing defect patterns;

performing target domain matching for the software code defect issue to identify a required domain set by:

measuring similarity between the software code defect issue and historical defect issues from software testing operations using the footprint, and identifying at least one target domain in the required domain set based on domains associated with the historical defect issues that have similarity measurements exceeding a predetermined similarity threshold;

identifying at least one resource, wherein the at least one resource is associated with a software testing expertise skill score associated with the at least one target domain in the required domain set, wherein software testing expertise relates to software development and testing methodologies, wherein the software testing expertise skill score meets a threshold;

identifying a targeted resource having a maximum overall defect issue resolution score, wherein the at least one resource comprises the targeted resource;

updating the required domain set by removing at least one domain wherein the required domain set comprises the at least one domain, wherein the at least one domain corresponds to software testing target domains in which the targeted resource is skilled for software testing defect resolution;

systematically and iteratively performing, until the required domain set is empty, the steps of identifying the at least one resource, identifying the targeted resource, and removing the at least one domain in a predetermined sequence to ensure comprehensive coverage of software testing expertise domains for coordinated team-based resolution of the software code defect issue, wherein the systematic removal ensures that each assigned resource contributes specific software testing domain expertise to the coordinated team-based resolution; and determining whether the software code defect issue has been resolved, wherein if the software code defect issue has not been resolved, repeating the performing target domain matching, wherein the method is performed by at least one processing device comprising a processor coupled to a memory.

2. The method of claim 1 wherein systematically and iteratively performing the steps further comprises:
assigning each targeted resource to a coordinated resolution team for the software code defect issue, wherein the coordinated resolution team comprises multiple targeted resources each contributing distinct software testing domain expertise.

3. The method of claim 1 wherein performing, by the software code defect issue analysis tool, analysis of the software code defect issue further comprises:
extracting the defect analysis characteristics directly from software testing execution logs generated during automated software testing operations, wherein the extracted defect analysis characteristics include at least three different types of software testing information selected from the group consisting of component information, module information, code line information, method information, assert information, and stack trace information performing, by a defect issue analysis tool, analysis of the defect issue; and identifying a footprint associated with the defect issue.

4. The method of claim 1 wherein performing target domain matching for the software code defect issue comprises:
measuring similarity between the software code defect issue and a historical software testing defect issue using Cosine Similarity for software testing defect pattern matching.

5. The method of claim 1 wherein identifying at least one target domain in the required domain set based on domains associated with the historical defect issues further comprises:
ranking the historical defect issues that exceed the predetermined similarity threshold based on their similarity measurements to the software code defect issue, and selecting target domains from highest-ranking historical defect issues to ensure the required domain set includes the most relevant software testing expertise domains.

6. The method of claim 5 further comprising:
identifying the software code defect issue is a duplicate of at least one historical software code defect issue based on the software testing execution patterns.

7. The method of claim 1 wherein performing target domain matching for the software code defect issue comprises:
determining there are no historical defect issues that exceed a similarity threshold;
identifying at least one historical defect issue, wherein the a similarity associated with the at least one historical defect issue approaches the similarity threshold;
ranking the at least one historical defect issue;
identifying at least one high ranking historical defect issue that ranks near the top of the ranked at least one historical defect issue;
identifying at least one second domain associated with the at least one high ranking historical defect issue; and
adding the at least one second domain to the required domain set.

8. The method of claim 1 wherein identifying the at least one resource comprises:
accessing a defect issue resolution repository to identify the at least one resource.

9. The method of claim 1 wherein identifying the targeted resource having a maximum overall defect issue resolution score comprises:
determining an availability score associated with the at least one resource.

10. The method of claim 1 wherein identifying the targeted resource having a maximum overall defect issue resolution score comprises:
determining an overall defect issue resolution score for the at least one resource, wherein the overall defect issue resolution score comprises a skill level of the at least one resource on the required domain set.

11. The method of claim 10 wherein determining an overall defect issue resolution score for the at least one resource comprises:
determining the at least one target domain in which the at least one resource is skilled.

12. The method of claim 1 wherein identifying the targeted resource having a maximum overall defect issue resolution score comprises:
determining a weighted overall software testing defect issue resolution score for the at least one resource wherein the weighted overall defect issue resolution weights an overall defect issue resolution score for the at least one resource and an availability score associated with the at least one resource based on software testing domain expertise; and
identifying the at least one resource with a highest weighted overall software testing defect issue resolution score as the targeted resource for software testing defect resolution.

13. The method of claim 1 wherein identifying the targeted resource having a maximum overall defect issue resolution score comprises:
transferring the software code defect issue to the targeted resource for resolution of the software code defect issue.

14. The method of claim 1 wherein identifying the targeted resource having a maximum overall defect issue resolution score comprises:
identifying a plurality of targeted resources; and
selecting a subset of the plurality of targeted resources for resolution of the software code defect issue.

15. The method of claim 1 wherein updating the required domain set by removing the at least one domain comprises:
identifying the at least one domain as the at least one target domain in which the targeted resource is skilled.

16. The method of claim 1 further comprising:
establishing a coordinated resolution team for the software testing defect issue by:
determining complementary software testing domain expertise among systematically assigned resources, wherein each systematically assigned resource contributes distinct software testing domain expertise that collectively addresses the required domain set for the software testing defect issue; and
configuring the systematically assigned resources as the coordinated resolution team based on the systematic removal process ensuring comprehensive coverage of software testing expertise domains, wherein the coordinated resolution team comprises multiple resources each skilled in different software testing target domains required for resolution of the software testing defect issue.

17. A system comprising:
at least one processing device comprising a processor coupled to a memory;
the at least one processing device being configured:
to receive, by an issue resolution system, from a tester system, a software code defect issue that occurred on the tester system while the tester system was executing automated software testing operations on software under test;
to perform, by a defect issue analysis tool, analysis of the software code defect issue to identify a footprint associated with the software code defect issue, wherein the footprint comprises defect analysis characteristics comprising component information, module information, code line information, software method information, test assert information, and software execution stack trace information specifically generated during software testing execution and indicative of software testing defect patterns;
to perform target domain matching for the software code defect issue to identify a required domain set by:
measuring similarity between the software code defect issue and historical defect issues from software testing operations using the footprint, and
identifying at least one target domain in the required domain set based on domains associated with the historical defect issues that have similarity measurements exceeding a predetermined similarity threshold;
to identify at least one resource, wherein the at least one resource is associated with a software testing expertise skill score associated with the at least one target domain in the required domain set, wherein the software testing domain relates to software development and testing methodologies, wherein the software testing expertise skill score meets a threshold;
to identify a targeted resource having a maximum overall defect issue resolution score, wherein the at least one resource comprises the targeted resource;
to update the required domain set by removing at least one domain wherein the required domain set comprises the at least one domain, wherein the at least one domain corresponds to software testing target domains in which the targeted resource is skilled for software testing defect resolution;
to systematically and iteratively perform, until the required domain set is empty, the steps of identifying the at least one resource, identifying the targeted resource, and removing the at least one domain in a predetermined sequence to ensure comprehensive coverage of software testing expertise domains for coordinated team-based resolution of the software code defect issue, wherein the systematic removal ensures that each assigned resource contributes specific software testing domain expertise to the coordinated team-based resolution; and
to determine whether the software code defect issue has been resolved, wherein if the software code defect issue has not been resolved, repeating the performing target domain matching.

18. A computer program product comprising a non-transitory processor-readable storage medium having stored therein program code of one or more software programs, wherein the program code when executed by at least one processing device causes said at least one processing device:
to receive, by an issue resolution system, from a tester system, a software code defect issue that occurred on the tester system while the tester system was executing automated software testing operations on software under test;
to perform, by a defect issue analysis tool, analysis of the software code defect issue to identify a footprint associated with the software code defect issue, wherein the footprint comprises defect analysis characteristics comprising component information, module information, code line information, software method information, test assert information, and software execution stack trace information specifically generated during software testing execution and indicative of software testing defect patterns;
to perform target domain matching for the software code defect issue to identify a required domain set by:
measuring similarity between the software code defect issue and historical defect issues from software testing operations using the footprint, and
identifying at least one target domain in the required domain set based on domains associated with the historical defect issues that have similarity measurements exceeding a predetermined similarity threshold;
to identify at least one resource, wherein the at least one resource is associated with a software testing expertise skill score associated with the at least one target domain in the required domain set, wherein the software testing expertise relates to software development and testing methodologies, wherein the software testing expertise skill score meets a threshold;
to identify a targeted resource having a maximum overall defect issue resolution score, wherein the at least one resource comprises the targeted resource;
to update the required domain set by removing at least one domain wherein the required domain set comprises the at least one domain, wherein the at least one domain corresponds to software testing target domains in which the targeted resource is skilled for software testing defect resolution;
to systematically and iteratively perform, until the required domain set is empty, the steps of identifying the at least one resource, identifying the targeted resource, and removing the at least one domain in a predetermined sequence to ensure comprehensive coverage of software testing expertise domains for coordinated team-based resolution of the software code defect issue, wherein the systematic removal ensures that each assigned resource contributes specific software testing domain expertise to the coordinated team-based resolution; and to determine whether the software code defect issue has been resolved, wherein if the software code defect issue has not been resolved, repeating the performing target domain matching.

* * * * *